United States Patent

Ryley

[15] 3,700,790

[45] Oct. 24, 1972

[54] COLOR TELEVISION CAMERAS

[72] Inventor: Derek Vernon Ryley, Claydon, Gyongyver, Essex, England

[73] Assignee: The Marconi Company Limited, London, England

[22] Filed: July 23, 1970

[21] Appl. No.: 57,707

[30] Foreign Application Priority Data

July 29, 1969 Great Britain..........37,994/69

[52] U.S. Cl. ..............................................178/5.4 M

[51] Int. Cl...............................................H04 9/08

[58] Field of Search .178/5.2, 5.4 M, 5.4 TC, 5.4 SY, 178/5.4 TE

[56] References Cited

UNITED STATES PATENTS

| | | | |
|---|---|---|---|
| 2,594,383 | 4/1952 | Bedford | 178/5.2 R |
| 3,404,220 | 10/1968 | Favreau | 178/5.4 B |
| 3,471,634 | 10/1969 | Clark et al. | 178/5.2 R |
| 3,536,824 | 10/1970 | Camillon | 178/5.4 M |

*Primary Examiner*—Robert L. Griffin
*Assistant Examiner*—John C. Martin
*Attorney*—Baldwin, Wight and Brown

[57] ABSTRACT

A system for correcting misregistration errors in color television camera compares indirectly one with another, the video signals derived from the different camera tubes. Certain variations in the video signals which satisfy predetermined conditions are used to produce further signals by means of which the comparisons are made, and which if a result of the comparison a misregistration situation is detected which satisfied further predetermined conditions an error correction signal is provided.

16 Claims, 11 Drawing Figures

INVENTORS
Derek Vernon Ryley
and
Gyöngyvér Claydon
BY Baldwin Wight Diller & Brown ATTORNEYS INVENTORS
Derek Vernon Ryley
and
Gyöngyvér Claydon BY Baldwin Wight Diller & Brown ATTORNEYS INVENTORS
Derek Vernon Ripley
and
Gyöngyver Claydon
BY Baldwin Wight Diller & Brown ATTORNEYS INVENTORS
Derek Vernon Ryley
and
Gyöngyvér Claydon
BY Baldwin Wight Diller & Brown ATTORNEYS INVENTORS
Derek Vernon Ryley
and
Gyöngyver Claydon
BY Baldwin Wight Diller & Brown ATTORNEYS INVENTORS
Derek Vernon Ryley
and
Gyöngyver Claydon
BY Baldwin Wight Diller & Brown ATTORNEYS INVENTORS
Derek Vernon Ryley
and
Gyöngyvér Claydon
BY Baldwin Wight Diller & Brown ATTORNEYS INVENTORS
Derek Vernon Ryley
and
Gyöngyvér Clayton
BY Baldwin Wight Diller & Brown ATTORNEYS INVENTORS
Derek Vernon Ryley
and
Gyöngyvér Clayton
BY Baldwin Wight Diller & Brown ATTORNEYS

COLOR TELEVISION CAMERAS

This invention relates to color television cameras and more particularly to color television cameras of the component camera tube type and seeks to provide improved color television cameras of this type.

According to this invention in its broadest aspect a registration system for use with a color camera of the component camera tube type comprises means, for each component camera tube video output signal, for determining and for producing signals representative of the occurrence of signals greater than a predetermined amplitude and having a rise or fall time shorter than or equal to a predetermined amount, and comparison means for comparing representative signals from two component camera tube video output signals to provide signals to be used in connection with at least one of the tubes to correct for errors in registration therebetween.

According to a feature of this invention a registration system for use with a color television camera of the component camera tube type comprises means for comparing the amplitude of each of two camera tube video component output signals fed thereto with the same two predetermined reference signals, and for producing from the comparison of each video component signal with the reference signals two digital signals, the amplitude of one of which indicates whether the video signal is above or below one of the reference levels and the amplitude of the other of which indicates whether the video signal is above or below the other reference level, means for determining when a component camera tube video output signal has passed from one reference level to another at a faster than a predetermined speed, and comparison means for comparing digital signals representative of different video outputs and corresponding to a transition at a faster than said predetermined speed and for producing as a result of the comparison signals to be used in connection with at least one of the tubes to correct for errors in registration thereof.

By the expression "digital signals" as used above and hereafter in the specification is meant signals having only two amplitude levels.

The two reference levels are preferably symmetrically spaced about the amplitude level of the video waveform representing "mid-grey."

There may be a single predetermined search line comprising a section of one line of the scanning sequence or a number of vertically aligned points on successive or alternate lines of the scanning sequence, but it is preferred to sample the digital outputs during at least one pair comprising one horizontal and one vertical search line in the same region of the picture area. By the expression "search line" as used throughout this specification is meant a portion of the scanning sequence during which a waveform is sampled.

The sampling may be confined to one pair of sampling search lines near the center of the picture area, or it may be carried out additionally over further pairs of search lines positioned elsewhere in the picture area. Theoretically sampling could be carried out continuously throughout the scanning sequence.

Preferably there is provided means for sampling said digital signals under the control of a clock frequency and for storing the sampled signals for the period between clock pulses, the sampled signals being fed to said means for determining when a component camera tube signal has passed from one reference level to another at a faster than a predetermined speed, said determining means detecting whether said transitions occur during a predetermined number of clock pulses.

Preferably again to provide horizontal registration said clock frequency is substantially in excess of the line frequency and to provide vertical registration said clock frequency is equal to said line frequency.

Preferably the two digital signals produced by a first camera tube are each fed directly to and are sampled by a store and digital signals produced by each of the remaining camera tubes are fed via a routing switch in time division multiplex to a further two stores such that said remaining camera tubes are successively brought into registration with said first camera tube.

Where the number of remaining camera tubes is two the routing switch may be switched at one quarter field frequency.

Preferably the said predetermined number of clock pulses is two.

Preferably means are provided whereby video signal transitions between the two reference levels which occur faster than or at said predetermined speed produce further signals derived from the aforesaid sampling of the digital signals and which are indicative of both the speed and polarity of the transition.

Hereinafter the last mentioned means will be referred to as "edge recognition means."

Preferably again the registration system includes means for comparing in pairs the signals derived from the sampling of the digital signals resulting from each video signal to determine whether a registration error is present by delaying one derived signal with respect to the other, and vice versa, by a predetermined amount to determine whether the pair of derived signals are out of registration by the said predetermined amount, and means are provided by which on detection of the said predetermined amount of misregistration in two video signal transitions of opposite polarity an output registration error correction signal is supplied.

Preferably the said comparison means has a limited range which is such as to prevent the output of registration error correction signals when the signals to be compared are the result of two video signal transitions which have a degree of misregistration which is greater than a low multiple of the sampling pulse periods.

The invention is further described, by way of example, in the accompanying drawings in which:

FIG. 4(*g*) is an explanatory figure;

Figure 1:
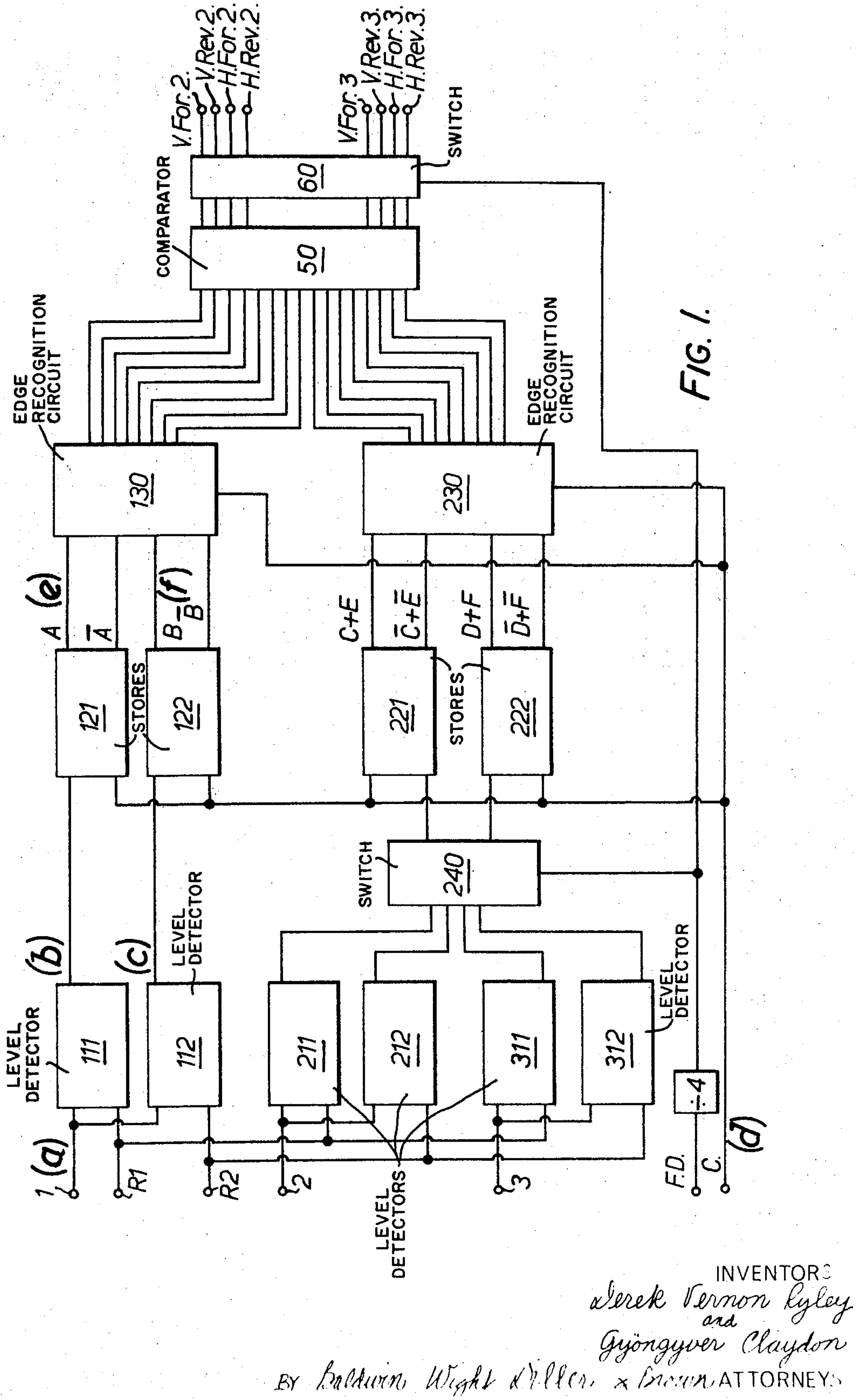
FIG. 1 shows in simplified schematic form, part of a three component color television camera in accordance with the invention.
Figure 6A:
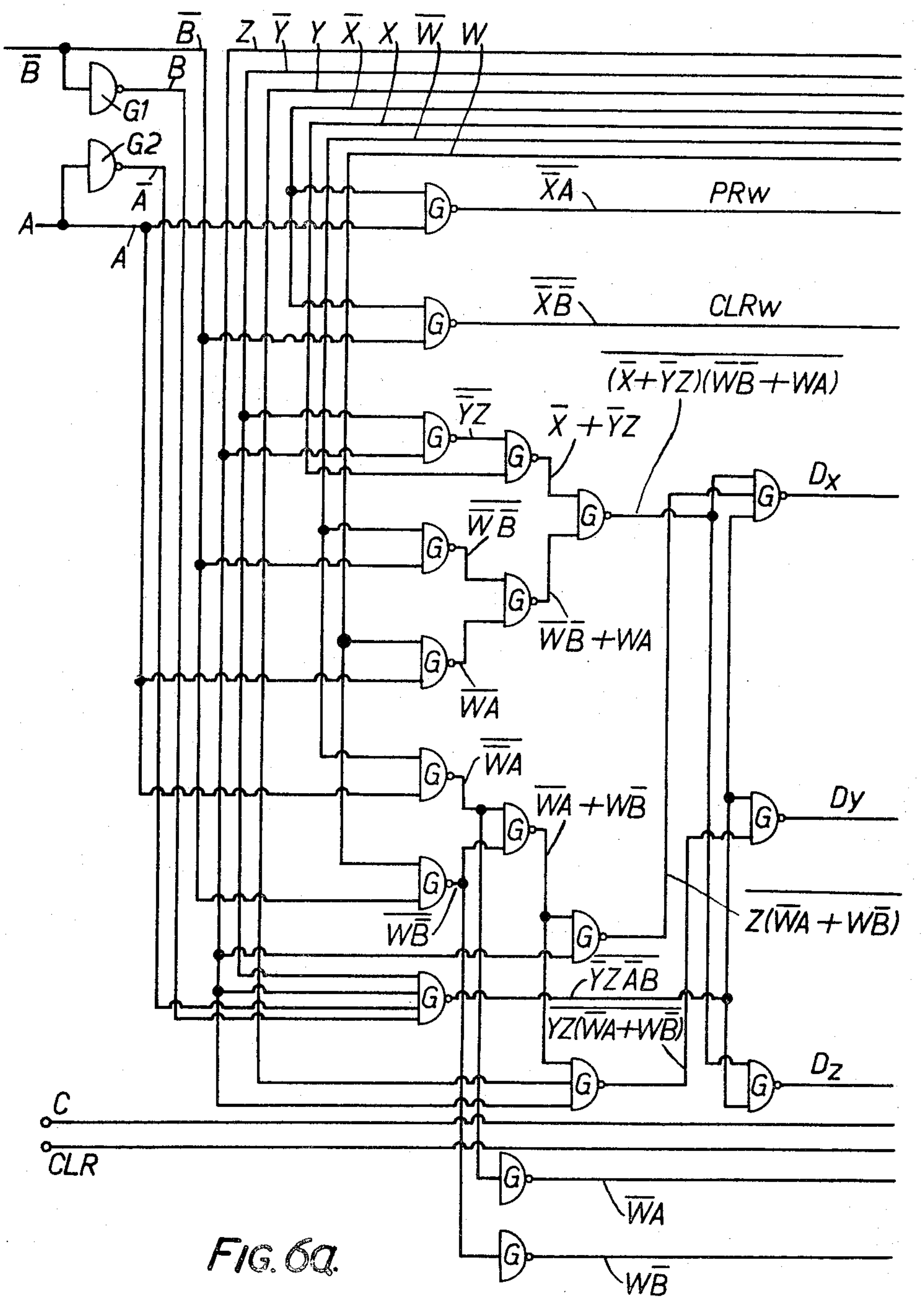
Figure 6B:
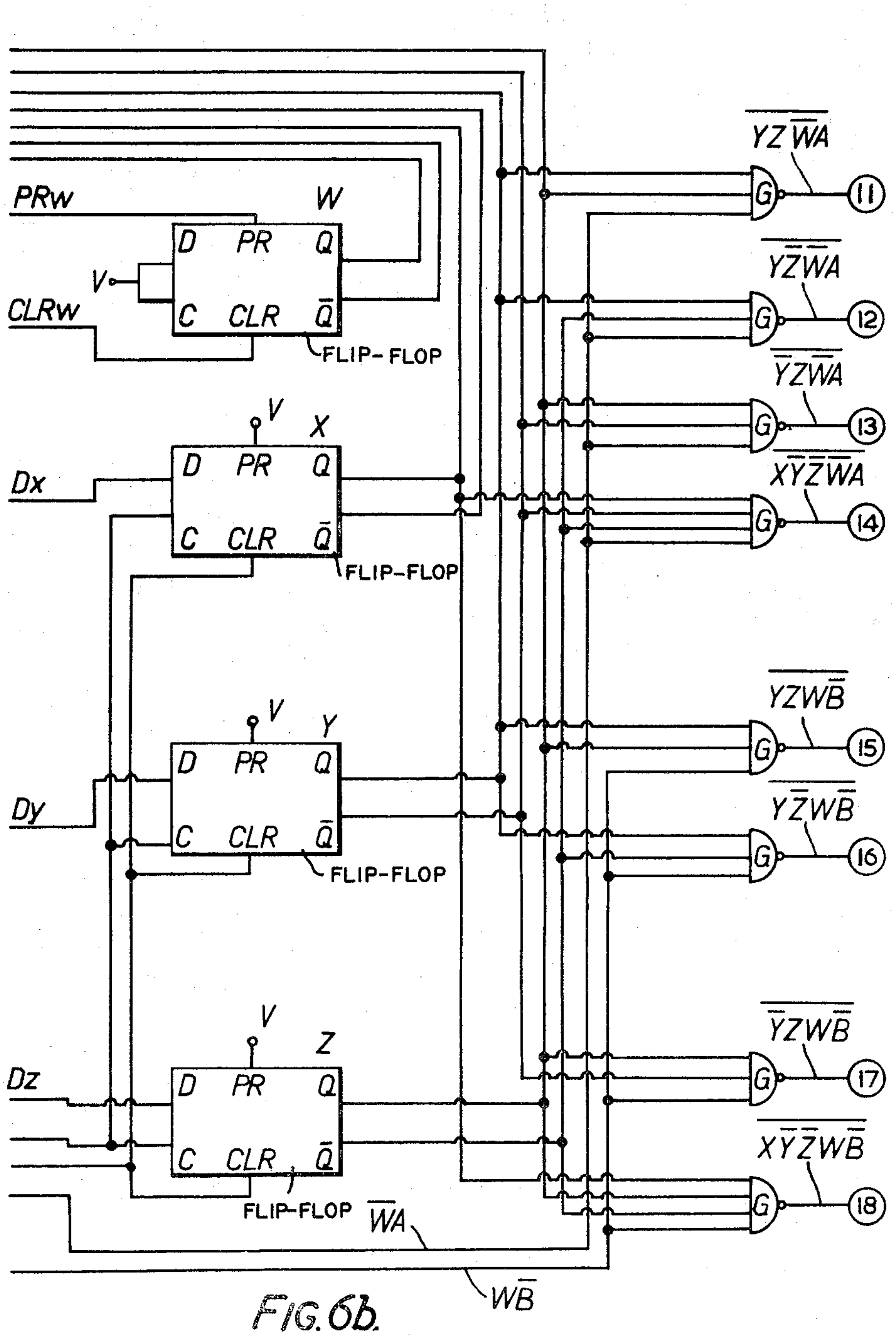
Figure 7:
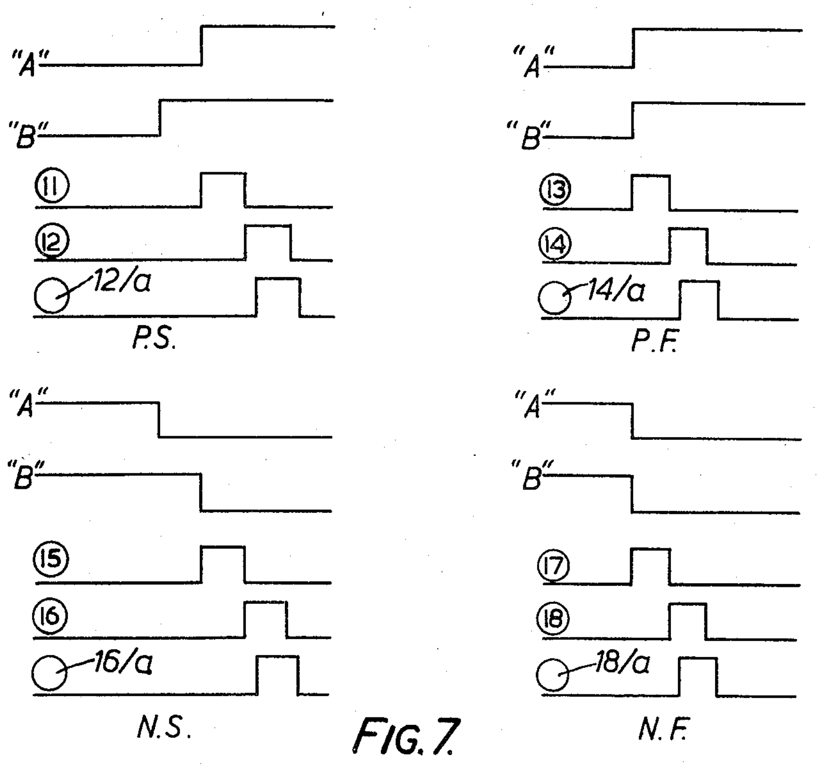
Figure 8:
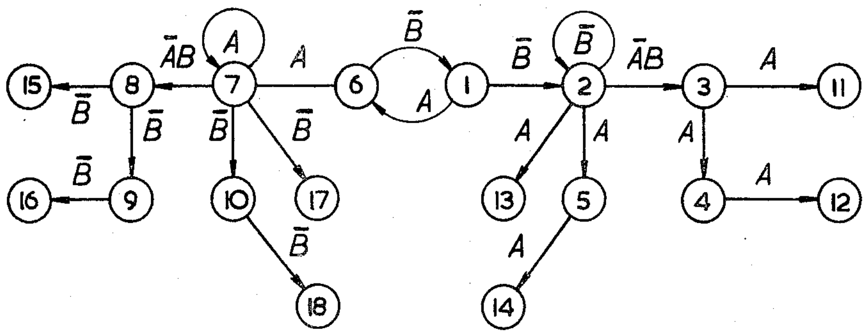

FIGS 6*a* and 6*b* illustrate in greater detail the circuitry of part of the camera of FIG. 1;

FIG. 7 is an explanatory graphical figure;

FIG. 8 is an explanatory schematic figure derived from FIG. 7; and

Figure 9A:
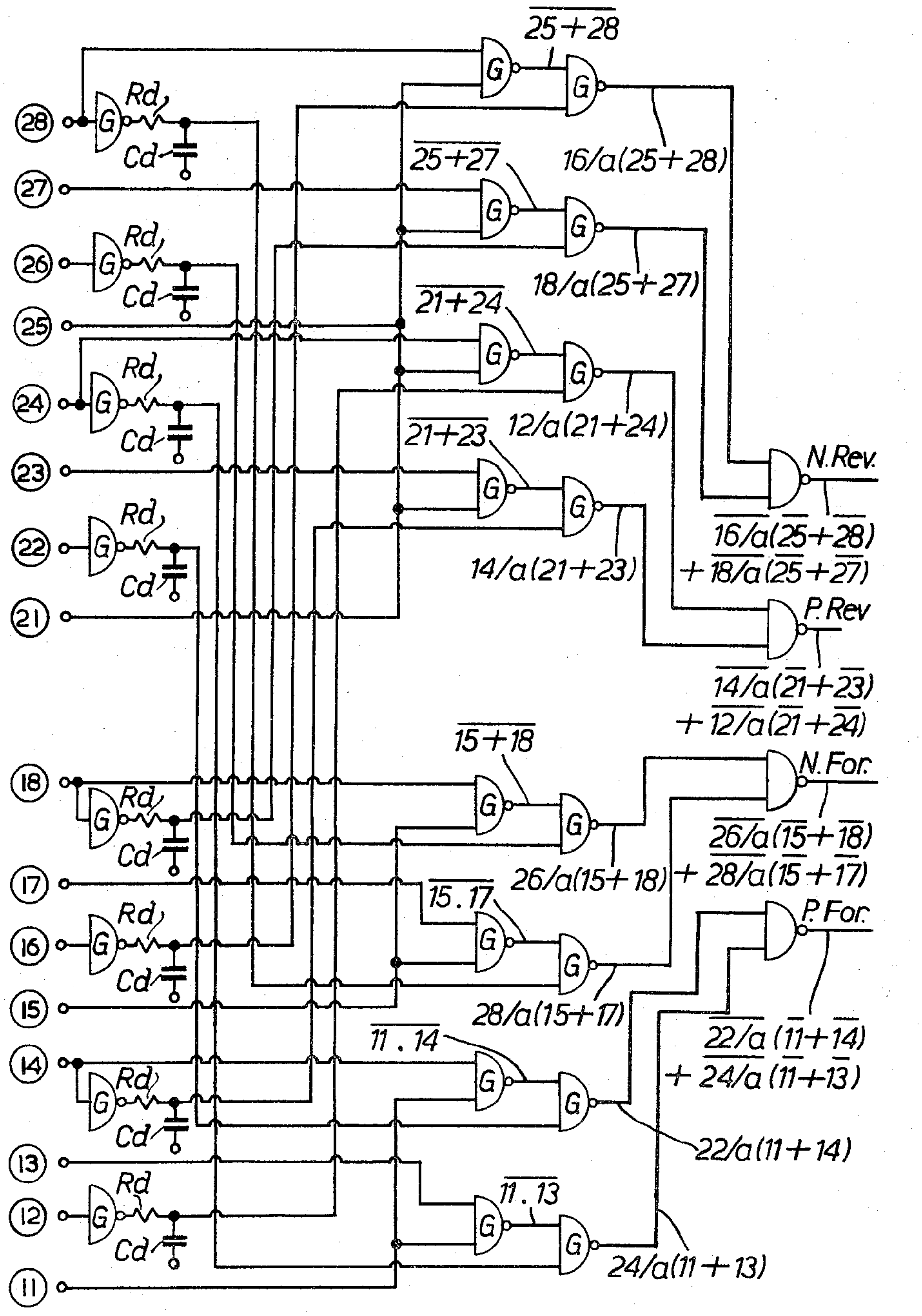

FIGS. 9*a* and 99*b* illustrate in greater detail the circuitry of a further part of the camera of FIG. 1.

Figure 2:
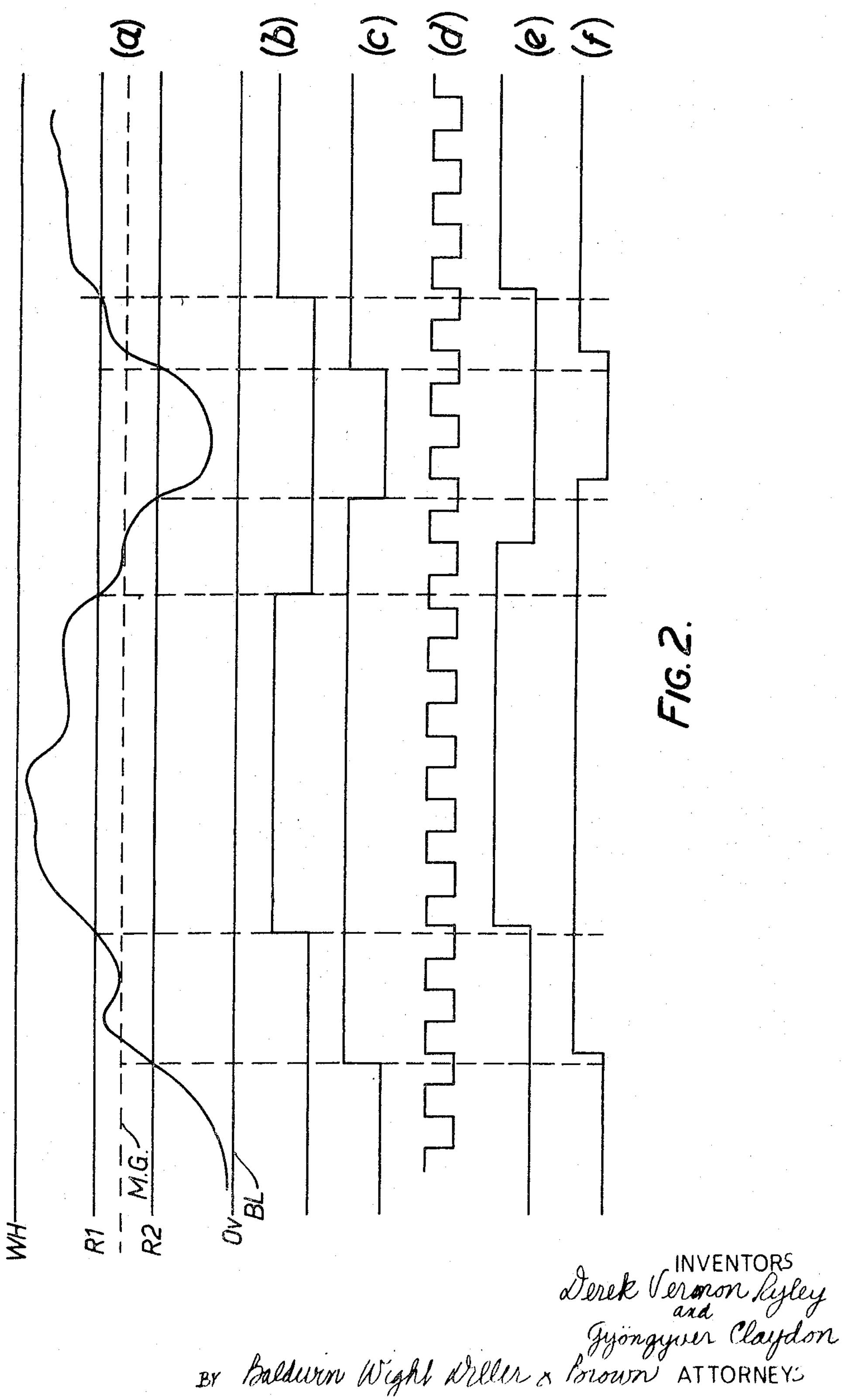
FIG. 2 shows, in lines (*a*) to (*f*), typical waveforms which appear at points similarly labelled in FIG. 1.

Referring to FIG. 1, the three component color television camera illustrated therein comprises three input terminals 1 – 3 to which the three component video signals derived from the three component camera tubes (not shown) are applied. The video signal components applied to terminals 1 – 3 will hereinafter be referred to as components 1 – 3 respectively. Component 1 is fed to first inputs of two level detectors 111 and 112 which are adapted to compare the level of component 1 with two reference levels applied to terminals R1 and R2 (referred to hereinafter as levels R1 and R2 respectively) and fed therefrom to second inputs of the level detectors 111, 112. Components 2 and 3 are fed to first inputs of further level detectors 211, 212 and 311, 312 respectively. Detectors 211, 311 receive reference level R1 at second inputs thereof and detectors 212, 312 receive level R2 at second inputs thereof. All the level detectors operate to compare the level of the signal applied to their first inputs with the reference level applied to their second inputs. Various known level detectors are suitable for this operation. A type of circuit which has proved satisfactory in practice is the so-called high gain differential amplifier. It is not essential, within the spirit of the invention, to use only two reference levels, although satisfactory operation of the arrangement has been achieved using only two reference levels as shown in FIG. 1 where the reference levels R1 and R2 are substantially symmetrically spaced about the "mid-grey" level of the video signal (labelled M.G. in line (*a*), FIG. 2). The "black" and "white" levels are labelled BL. and WH. in line (*a*), FIG. 2. The closer the spacing of the reference levels the more frequent is the correction of registration of the camera. Reference levels at 40% and 60 percent of the "peak white" voltage have been found to give satisfactory results in some applications. An improvement in sensitivity (i.e., frequency of registration correction) may be obtained by using additional reference levels symmetrically spaced about the half amplitude level of the video waveform, but this measure introduces further complexity to the camera. The level detectors 111, 112, 211, 311, 312 provide as an output signal one or the other of two binary states in dependence upon whether the video component signal is higher or lower than the reference level with which it is compared in any particularly level detector. A typical component waveform and the outputs of the two level detectors to which it is applied are shown in FIG. 2 lines (*a*) – (*c*) respectively.

The digital signals from each level detector are applied to one or other of four stores 121, 122, 221, 222. The stores may take a variety of forms, but may conveniently be type D flip-flops such as Mullard type FJJ131. Clock pulses applied at a terminal C, and hereinafter referred to as clock pulses C, are fed to the stores to initiate line and field sampling.

Figure 3:
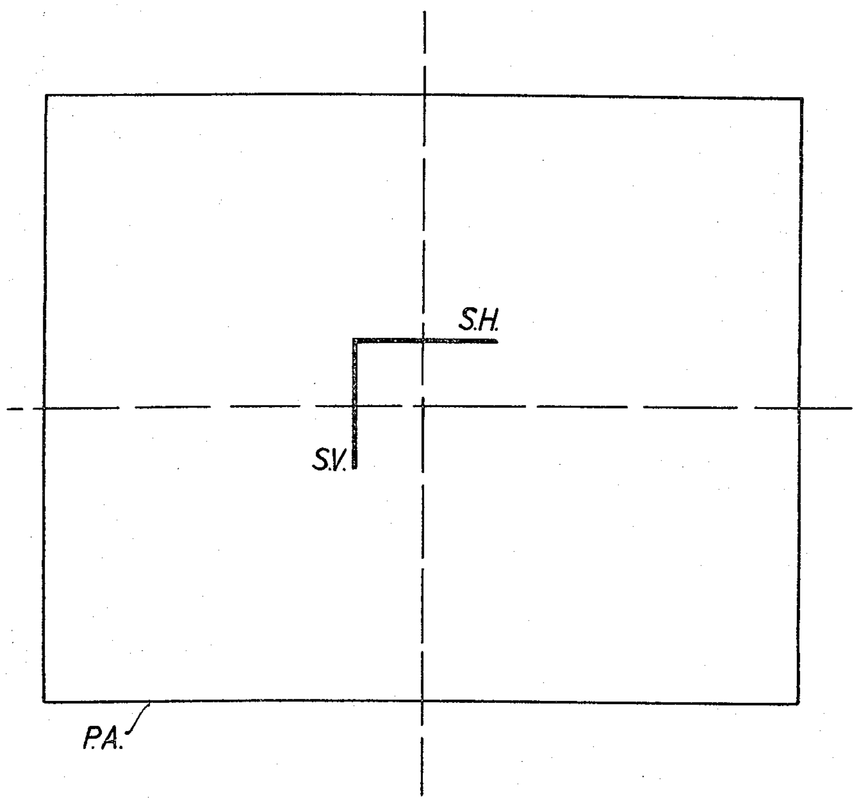
FIG. 3 shows in diagrammatic form an indication of the parts of the scanning sequence during which sampling of the video waveform typically may be effected.

Clock pulses having two distinct pulse repetition frequencies are used in succession. One pulse repetition frequency is the same as the line frequency and is used during the period in which vertical registration is to be effected. The fact that in this case the clock pulse repetition frequency is the same as the line frequency means that a clock pulse occurs in the same position on successive horizontal scans. It is arranged that the positive going edge of each of these clock pulses occurs in substantially the center of the picture area, and the portion of the scanning sequence which coincides with these positive going clock pulse edges constitutes the "-vertical search line." The other pulse repetition frequency may be generated by a 5 MHz free running multivibrator and is used to effect horizontal registration. In practice these clock pulses would be applied to terminal C during part of a single horizontal scan, this portion constituting the "horizontal search line." Considering now FIG. 3 horizontal registration is effected first and occurs during that portion of the single horizontal scan marked S.H., and it is during this part of the horizontal scan that the clock pulses required for horizontal registration are applied to terminal C. During subsequent horizontal scans the clock pulse required for vertical registration are applied to terminal C, and the positive going edge of each clock pulse is arranged to occur when the horizontal scan crosses the vertical search line marked S.V. The stores act to sample the digital signals from the level detectors on the occurrence of the positive going edge of a clock pulse, the flip-flops being clocked at the frequency of the clock pulses and the outputs from said flip-flops taking up the states of the digital signals at the time of sampling and remaining in that state until the next clock pulse is received. FIG. 2 line (*d*) shows a train of sampling clock pulses and lines (*e*) and (*f*) show the variations in the outputs of the flip-flops which receive the waveform of lines (*b*) and (*c*).

In the preferred embodiment of the invention now being described components 2 and 3 time-share the stores 221 and 222. It is of course possible to use four separate stores and avoid such time sharing but it has been found that this is not essential and since it would involve a greater complexity of apparatus, the practice is not preferred. The time sharing is effected by means of a switch 240 which is switching between two states by a train of pulses applied at terminal F.D. at television field frequency and divided in frequency by four in unit 4. In one state switch 240 connects level detectors 211 and 212 to stores 221 and 222. In the other state level detectors 311 and 312 are connected to stores 221 and 222. Because the time sharing is at one quarter field frequency is it assured that each camera tube signal is sampled during an odd and an even consecutive field.

Although it is feasible to sample the digital signals from the level detectors throughout the whole of the scanning sequence this is not normally necessary. Where only centering of the picture is required, sampling is carried out during short periods of the scanning sequence defined by a pair of search lines near the center of the picture area PA (FIG. 3), such as those shown in FIG. 3 at SH as a horizontal scanning search line and SV as a vertical search line as previously described. Other pairs of search lines (not shown) may be introduced at suitable places (for example near the four corners of the picture area) if it is desired to correct for errors of height, width, linearity, skew and twist.

Figure 4:
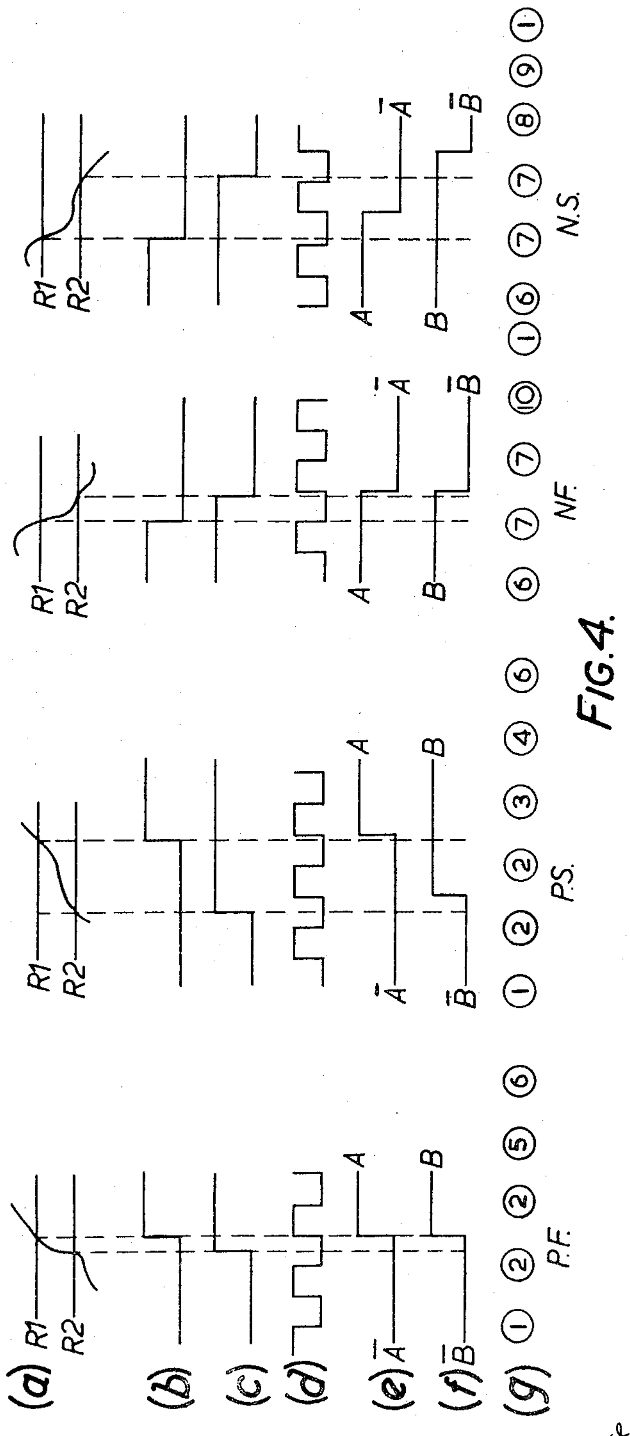
FIG. 4 shows in lines (*a*) to (*f*) typical waveforms which may be utilized for registration correction in the apparatus of FIG. 1 and which appear at points similarly referenced in FIG. 1.

The sampled digits appearing at the outputs of stores 121, 122, 221, 222 are applied as inputs to two edge recognition circuits 130 and 230. The outputs from stores 121, 122 are applied to circuit 130 and those from 221 and 222 are applied to recognition circuit 230. If instead of time shared stores 221 and 222 there are four separate stores either switch 240 could be placed between the stores and circuit 230 so that the latter is time shared, or there could be provided, at the expense of greater complexity, two separate edge recognition circuits in the place of edge recognition circuit 230. The edge recognition circuits 130 and 230 are designed to recognize four types of edge, where the term "edge" as used throughout this specification is used to denote a transition of the video signal between the two reference levels. A more detailed description of the edge recognition circuits is given below in association with FIGS. 5, 6*a* and 6*b*. The types of edge recognized by circuits 130 and 230 are shown in FIG. 4 in which the four parts PF, PS, NF, NS illustrate respectively a fast positive going edge, a slow positive going edge, a fast negative going edge and a slow negative going edge. Lines (*a*) to (*f*) of FIG. 4 represent the waveforms appearing at the places so indicated on FIG. 1. It will be noted that the waveforms illustrated are those associated with component 1. Those associated with components 2 and 3 would in practice be obtained in exactly the same way. The states of the signals from stores 121, 122 shown at lines (*e*) and (*f*) in FIG. 4 are labelled A, $\overline{A}$, $\overline{B}$, B, and it is in this form that the digits are fed to the edge recognition circuits as shown in FIG. 1 by appropriate labels on the inputs to edge recognition circuit 130. The inputs to circuit 230 corresponding to the component video signals 2 and 3 are labelled C + E, $\overline{C} + \overline{E}$, D + F, $\overline{D} + \overline{F}$ and represent in Boolean algebra the states of the binary digits derived from components 2 or 3 corresponding to A, $\overline{A}$, B, $\overline{B}$ respectively. The four types of edge recognized by the edge recognition circuits are then, with reference to FIG. 4 as follows:

at PF : a positive-going transition simultaneously from $\overline{B}$ to B and from $\overline{A}$ to A;

at PS : a positive-going transition from $\overline{B}$ to B occuring one clock pulse earlier than a positive-going transition from $\overline{A}$ to A;

at NF : a negative-going transition simultaneously from A to $\overline{A}$ and from B to $\overline{B}$;

at NS : a negative-going transition from A to $\overline{A}$ occurring one clock pulse earlier than a negative-going transition from B to $\overline{B}$.

By recognizing only edges of the above types it is assured that the circuit does not act on low definition information which would cause a delay of more than one sampling clock pulse between A and B transitions.

With further reference to FIG. 1, recognized edges cause gating pulses to be fed from circuits 130 and 230 to a comparator 50. Comparator 50 is designed, as described in further detail below, to compare edges of the same sense which are derived from the different camera tube signals. Where the occurrence of recognized edges is not simultaneous in circuits 130 and 230 and if certain other conditions (described below) are fulfilled it is likely that the cause for such non-coincidence is a registration error and, if this the case, comparator 50 provides an output registration correction signal of the appropriate type. Output from the comparator is applied to a further switch 60 synchronized to switch 240 by divided frequency television field pulses from the unit 4. Thus output from comparator 50 may be directed to correct for misregistration with respect to component 1 either component 2 or component 3 in dependence upon which of components 2 and 3 is at any given time being compared with component 1. As shown in FIG. 1 the comparator provides one of eight correction signals, VF2, VR2, HF2, HR2, VF3, VR3, HF3, HR3, until the error is corrected. The correction signals are as follows:

VF2 = vertical correction forward on component 2
VR2 = vertical correction reverse on component 2
HF2 = horizontal correction forward on component 2
HR2 = horizontal correction reverse on component 2 and similarly for component 3.

The registration error correction signals may be used to derive scan correction waveforms or alternatively they may be used to control a motor driven potentiometer arrangement which controls the centering circuitry.

The conditions of operation of comparator 50 are as follows: Firstly the comparator is arranged not to attempt to initiate correction signals to line up edges which are more than two clock pulses apart. This is so that the registration correction system ignores fine picture detail. Secondly the comparator is designed to give an error correction signal only when it receives a positive and a negative edge with the error in the same direction in both. This is desirable since it is found in practice that if a correction signal is permitted after only one edge, maloperation of the circuit may be initiated where there occur in close proximity a luminance edge unaccompanied by a chrominance edge and a chrominance edge unaccompanied by a luminance edge. The adoption of a limitation to working on two edges reduces the possibility of such an error.

As mentioned above, the edge recognition circuits 130 and 230 are such as to recognize edges of the four types shown in FIg. 4.

Figure 5:
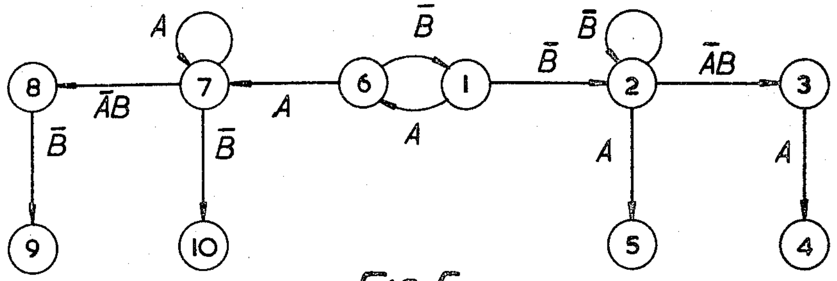
FIG. 5 is an explanatory schematic figure derived from FIG. 4.

Each edge recognition circuit has 10 different logic states labelled (1) – (10); states (1) – (5) being used to recognize positive-going edges PF and PS and states (6) – (10) being used to recognize negative-going edges NF and NS. The 10 states are shown in FIG. 5 together with the input signal necessary to change one existing logic state to the next logic state. In the absence of a recognized edge the edge recognition circuit reverts to one of the initial states (1) or (6). As the successive binary levels of the signals from stores 121 and 122 (in the case of circuit 130) are received acceptable signals cause the edge recognition circuit to alter its logic state on the occurrence of clock pulses C which are fed to it. Thus if the edge recognition circuit is in initial state (6) when a $\overline{B}$ level is received from a store, the edge recognition circuit takes up state (1) since if an edge is to follow, it must be a positive-going edge. Subsequently one or more further $\overline{B}$ signal level inputs will cause a transition to state (2). Considering FIG. 4 it will be seen that if whilst logic state (2) exists an A condition results from the occurrence of a PF edge, logic state 5 of FIG. 5 is produced. Alternatively the $\overline{A}B$ condition (i.e., the output from state 121 being $\overline{A}$ and the output from store 122 being B simultaneously) causes a logic state (3) as indicated to be obtained. This could represent either a slow positive-going edge PS or an unacceptable edge, and an A signal level is required on the next clock pulse to produce a transition to state (4) to confirm the edge PS. The logic state will now revert to state (1) unless an A signal level is received on the next clock pulse. A similar process is effected through states (6) to (10) for negative-going edges. Line (*g*) of FIG. 4 shows the states taken up by the edge recognition circuit (130, say) during the "acceptable" transitions. The 10 states (1) – (10) conveniently may be implemented by employing ten of the sixteen binary codes available using four type D flip-flops. The choice of the codes used for the 10 states is arbitrary. It has been found convenient in practice to use the following 10 states of four type D flip-flops *W*, *X*, *Y*, *Z*.

| | |
|---|---|
| $(1) = \overline{W}\,\overline{X}\,\overline{Y}\,\overline{Z}$ | $(2) = \overline{W}\,X\,\overline{Y}\,Z$ |
| $(3) = \overline{W}\,X\,Y\,Z$ | $(4) = \overline{W}\,X\,Y\,\overline{Z}$ |
| $(5) = \overline{W}\,X\,\overline{Y}\,\overline{Z}$ | $(6) = W\,\overline{X}\,\overline{Y}\,\overline{Z}$ |
| $(7) = W\,X\,\overline{Y}\,Z$ | $(8) = W\,X\,Y\,Z$ |
| $(9) = W\,X\,Y\,\overline{Z}$ | $(10) = W\,X\,\overline{Y}\,\overline{Z}$ |

Since six of the 16 available four bit binary codes are not used some of the 10 above listed codes may be uniquely identified without requiring the use of all four bits of their code. Leaving out these surplus bits gives the following 10 codes for the 10 states.

| | |
|---|---|
| $(1) = \overline{W}\,\overline{X}$ | $(6) = W\,\overline{X}$ |
| $(2) = \overline{W}\,\overline{Y}\,Z$ | $(7) = W\,\overline{Y}\,Z$ |
| $(3) = \overline{W}\,Y\,Z$ | $(8) = W\,Y\,Z$ |
| $(4) = \overline{W}\,Y\,\overline{Z}$ | $(9) = W\,Y\,\overline{Z}$ |
| $(5) = \overline{W}\,X\,\overline{Y}\,\overline{Z}$ | $(10) = W\,X\,\overline{Y}\,\overline{Z}$ |

It can be seen that for all the states (1) to (5) the $\overline{W}$ condition of the flip-flop *W* and for all the states (6) to (10) the W condition is required. If the drive and clock inputs of a type D bistable are maintained at a high positive potential then an input applied to the PRE-SET input is transferred to the output at Q until this is reversed by applying an input to the CLEAR input and vice versa, therefore when states (1) to (5) are required a signal is applied to the CLEAR terminal and when states (6) to (10) are required an input will be applied to the PRE-SET terminal.

The input applied to the CLEAR terminal is $\overline{X}\,\overline{B}$ and that applied to the PRE-SET terminal is $\overline{X}$ A since from the above table $\overline{X}$ is used to characterize states (1) and (6) and A denotes the possibility of a negative-going edge occurring and $\overline{B}$ denotes the possibility of a positive-going edge occurring.

The condition for the circuit to go to any state and stay there (other than states (1) and (6) to which the circuit is arranged to revert in the absence of a recognized edge) is the condition for the circuit to be in the previous state and the condition for a suitable transition between the states. Therefore combining each state from the above table with the required transition (obtained from FIG. 5) gives the following conditions:

| | |
|---|---|
| Condition to reach state | $(2) = \overline{W}\,\overline{X}\,\overline{B} + \overline{W}\,\overline{Y}\,Z\,\overline{B}$ |
| " " " " | $(3) = \overline{W}\,\overline{Y}\,Z\,\overline{A}\,B$ |
| " " " " | $(4) = \overline{W}\,Y\,Z\,A$ |
| " " " " | $(5) = \overline{W}\,\overline{Y}\,Z\,A$ |
| " " " " | $(7) = W\,\overline{X}\,A + W\,\overline{Y}\,Z\,A$ |
| " " " " | $(8) = W\,\overline{Y}\,Z\,\overline{A}\,B$ |
| " " " " | $(9) = W\,Y\,Z\,\overline{B}$ |
| " " " " | $(10) = W\,\overline{Y}\,Z\,\overline{B}$ |

The formulas giving the gating for the D inputs of flip-flops *X*, *Y*, *Z* is obtained from the first table of states (1) – (10). Selecting states in which X occurs gives:

$$D_X = (2) + (3) + (4) + (5) + (6) + (7) + (8) + (9) + (10)$$

Substituting the conditions necessary to reach each of these states gives:

$$D_X = (\overline{W}\,\overline{X}\,\overline{B} + \overline{W}\,\overline{Y}\,Z\,\overline{B}) + \overline{W}\,\overline{Y}\,\overline{Z}\,\overline{A}\,B + \overline{W}\,Y\,Z\,A + \overline{W}\,\overline{Y}\,Z\,A + (W\,\overline{X}\,A + W\,\overline{Y}\,Z\,A) + W\,\overline{Y}\,Z\,\overline{A}\,B + W\,\overline{Y}\,Z\,\overline{B}$$

$$= (\overline{X} + \overline{Y}Z)(\overline{W}\,\overline{B} + W\,A) + Z(\overline{W}A + W\overline{B}) + \overline{Y}\,Z\,\overline{A}\,B$$

This means that when the conditions represented by this equation exists at the $D_X$ input an X output is obtained from the *X* flip-flop. When this condition does not exist the *X* flip-flop takes up the $\overline{X}$ state. Similarly:

$$D_Y = (3) + (4) + (8) + (9)$$

$$= \overline{W}\,\overline{Y}\,Z\,\overline{A}\,B + \overline{W}\,Y\,Z\,A + W\,\overline{Y}\,Z\,\overline{A}\,B + W\,Y\,Z\,\overline{B}$$

$$= \overline{Y}\,Z\,\overline{A}\,B + Y\,Z(\overline{W}A + W\overline{B})$$

and $$D_Z = (2) + (3) + (7) + (8)$$

$$= (\overline{W}\,\overline{X}\,\overline{B} + \overline{W}\,\overline{Y}\,Z\,\overline{B}) + \overline{W}\,\overline{Y}\,Z\,\overline{A}\,B + (W\,\overline{X}\,A + W\,\overline{Y}\,Z\,A) + W\,\overline{Y}\,Z\,\overline{A}\,B$$

$$= (\overline{X} + \overline{Y}Z)(\overline{W}\,\overline{B} + W\,A) + \overline{Y}\,Z\,\overline{A}\,\overline{B}$$

It will be noted that the $D_Z$ input to flip-flop *X* required for this flip-flop to give an X output involves the conditions for any of the possible logic states with the exception of states (1) or (6). If an unacceptable edge occurs the required $D_Z$ input will not be obtained since none of the specified conditions for the logic states (2) to (5) or (7) to (10) then occur and an $\overline{X}$ output will be obtained from the *X* flip-flop. Referring to the logic state table it will be seen that $\overline{X}$ is used to characterize states (1) and (6) and hence an unacceptable edge causes the circuit to revert to state (1) if flip-flop *W* is in state $\overline{W}$ and to state (6) if flip-flop *W* is in state W.

These equations (i.e., PRE-SET *W* CLEAR *W*, $D_x$, $D_Y$, $D_Z$) represent the Boolean conditions required at the inputs of the flip-flops *W*, *X*, *Y*, *Z*.

One implementation of these inputs is illustrated in FIGS. 6*a* and 6*b* which show the detailed gating circuitry of an edge recognition circuit (circuit 130. Circuit 230 would, in practice, be the same). The gating circuitry will not be described in detail as it is derived directly from the theoretical expression given above.

Each gate G represents a NAND gate. It will be noted that only inputs A and $\overline{B}$ are fed to the input terminals of this circuit. However the $\overline{A}$ and B signals are derived by gates G1 and G2 which provide simply an inverting function. The use of NAND gates throughout results in the inversion of the required Boolean expressions at the inputs to the flip-flops. This is merely a practical economy and does not affect the validity of the theoretical expressions. The actual expressions are indicated on the circuit diagram.

The four flip-flops *W*, *X*, *Y*, *Z* are labelled simply W, X, Y, Z and each has a PRE-SET input PR, a CLEAR input CLR, D and clock pulse inputs D and C respectively and outputs Q, $\overline{Q}$. Unused inputs throughout the circuit are anchored to a potential labelled V. Inputs A and B are taken from stores 121, 122 (not shown in FIGS. 6*a* and 6*b*) and it will be seen from the logic of the circuit that the required Boolean algebraic expressions are available at the *D* inputs to the flip-flops *X*, *Y*, $Z$ on lines $D_X$ $D_Y$ $D_Z$ and at the inputs PR and CLR of flip-flop $W$.

The edge recognition circuits 130 and 230 produce gating pulses for the comparator 50. Each recognized edge produces two pulses, one of which is initiated immediately after the other, and which pulses are routed to particular output terminals of circuitry 130 or 230. These pulses are required by the comparator to compare edge information associated with each of the channels 1, 2 and 3 and to enable a suitable correction signal to be produced. The conditions under which the gating pulses are produced are indicated in FIG. 8, which is the same as FIG. 5 except that additional states (11) – (18) have been added. These additional states are provided so that the output from the level detectors and hence stores 121, 122, 221 and 222 remain unaltered for a further two clock pulses. This means that in the case of a recognized positive-going edge an A level must be present for a further two clock pulses and for a recognized negative-going edge a $\overline{B}$ level must be similarly present. Thus on FIG. 8 the transitions to reach states (11) – (14) and states (15) – (18) are indicated as A and $\overline{B}$ respectively. The Boolean expressions for the states (11) – (18) are the conditions for reaching these states, e.g., for state (11) the condition is the existence of state (3) and a transition A, i.e., $\overline{W}\,Y\,Z\,A$. Hence:

Condition to reach state (11) $= Y\,Z\,\overline{W}\,A$
" " " " (12) $= Y\,\overline{Z}\,\overline{W}\,A$
" " " " (13) $= \overline{Y}\,Z\,\overline{W}\,A$
" " " " (14) $= X\,\overline{Y}\,\overline{Z}\,\overline{W}\,A$
" " " " (15) $= Y\,Z\,\overline{W}\,\overline{B}$
" " " " (16) $= Y\,\overline{Z}\,W\,\overline{B}$
" " " " (17) $= \overline{Y}\,Z\,W\,\overline{B}$
" " " " (18) $= X\,\overline{Y}\,\overline{Z}\,W\,\overline{B}$ The recognized edges and their corresponding gating pulses (which correspond to states (11) – (18)) are shown in FIGS. 7 at PF, PS, NF and NS where the references have the same meaning as they do in FIG. 4. As will be seen the pair of gating pulses corresponding to each recognized edge are spaced one clock pulse apart in time; this follows from FIG. 8, from which it will be appreciated that it is necessary to pass through one more state to reach end states (12), (14), (18) and (16) than it is to reach end states (11), (13), (15) and (17). Hence gating pulses (12), (14), (16) and (18) are delayed with respect to gating pulses (11), (13), (15) and ( (17). The pulses indicated as (12/*a*), (14/*a*) and (18/*a*) are produced by the comparator 50 and will be discussed later.

One practical implementation of conditions (11) – (18) is shown in the right hand part of FIGS. **6*a* and 6*b***. The circuit shown therein follows directly from the Boolean expressions given previously and the required Boolean conditions for gating pulses (11) – (18) appear at the terminals so labelled. Again it will be noted that the use of NAND gates has resulted in an overall inversion of the theoretical expressions.

Gating pulses (11) – (18) are fed to inputs (11) – (18) respectively of the circuit shown in FIGS. **9*a* and 9*b* which represents the comparator 50 and switch 60. It is assumed that inputs (11) – (18) are derived from edge recognition circuit 130 and corresponding inputs (21) – (28) from edge recognition circuit 230**. The pulses (12/*a*), (14/*a*), (16/*a*) and (18/*a*) which are pulses (12), (14), (16), and (18) respectively delayed by a fraction of a clock pulse period are produced by the input circuitry of the comparator 50 in which, for example, pulse (12/*a*) is produced by passing pulse (12) through a resistance Rd connected via a capacitance Cd to earth. Values for the components Rd and Cd of 180 Ω and 470 pF respectively have been found suitable in practice and give a delay (typically) of about 100 nS. Such delayed pulses are shown in FIG. 7.

The left hand side of the comparator circuit shown in FIGS. **9*a*and 9*b* is used to determine when two recognized edges are not in register, and whether a recognized edge in either channel 2 or 3 occurs before or after a recognized edge in channel 1. Pulses representing a recognized edge on either channel 2 or 3 are delayed and compared with an undelayed edge on channel 1, and an output signal generated if coincidence occurs. Similarly pulses representing a recognized edge on channel 1 are delayed and compared with an undelayed edge on channel 2 or 3**.

Where two edges provided by edge recognition circuits 130 and 230 are not in register and fulfil the required conditions the Boolean algebraic expressions for the presence of an error correction signal needed for channel 2 or 3 are as follows:

N. Rev. = negative-going edge: reverse correction $= 16/a\,(28+25) + 18/a\,(27+25)$ P. Rev. = positive-going edge: reverse correction $= 12/a\,(24+21) + 14/a\,(23+21)$ N. For. = negative-going edge: forward correction $= 28/a\,(17+15) + 26/a\,(18+15)$ P. For. = positive-going edge: forward correction $= 24/a\,(13+11) + 22/a\,(14+11)$ where the encircling of the states has been dropped for clarity.

Figure 9B:
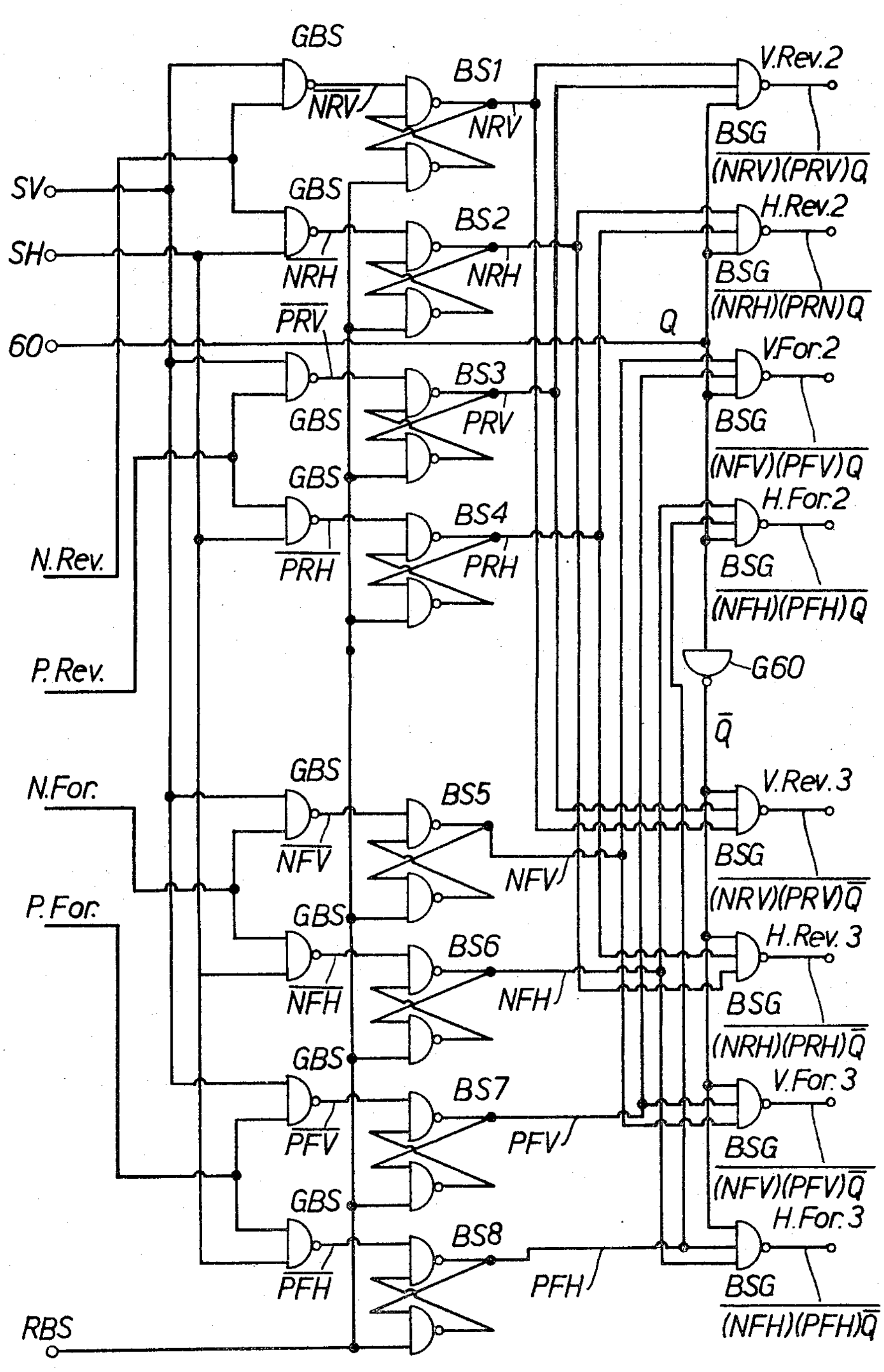

The implementation of FIG. **9*a* provides the gating for these correction signals, which appear at the points referenced N. Rev., P. Rev., N. For., P. For. The intermediate Boolean expressions are indicated on the figure to show clearly how the resultant expressions are derived. As before, the most economical use of NAND gates G results in inversion of the theoretical expressions. The generation of the correction signals at points labelled V. Rev. 2, H. Rev. 2, etc., in FIG. 9*b*( where the labels indicate "vertical scanning: reverse correction to component 2**," etc.) is controlled by means of bistables BS which receive as inputs via gates GBS on or other of signals N. Rev., P. Rev., N. For., P. For. together with one or other of inputs S.V., S.H.

The Boolean expressions for the output correction signals are as follows:

V. Rev. 2 = (NR.V) (PR.V) Q
H. Rev. 2 = (NR.H) (PR.H) Q
V. For. 2 = (NF.V) (PF.V) Q
H. for 2 = (NF.H) (PF.H) Q V. Rev. 3 = (NR.V) (PR.V Q
H. Rev. 3 = (NR.H) (PR.H) Q
V. For. 3 = (NF.V) (PF.V) Q
H. For. 3 = (NF.H) (PF.H) Q where NR represents N. REv., PR represents P. Rev., NF represents N. For., PF represents P. For., V represents input S.V., H represents input S.H., and Q,$\overline{Q}$ represents the action of switch 60. The practical implementation of these expressions in FIG. **9*b*** involves the use of NAND gates and the output signals obtained represent the inversion of the above expressions. Inputs S.V., S.H. occur during the vertical and horizontal search lines respectively and are derived from line drive and field drive pulses fed into monostable multivibrators (not shown) or by any other suitable means. Gates GBS therefore serve to route each of the N. Rev., P. Rev., N. For., P. For. signals to a particular one of two alternative bistables in dependence on the occurrence of the vertical search lines or the horizontal search lines. Thus each of the bistables BS receives as input a signal which is defined in terms of the direction of the compared edge, i.e., positive or negative-going, the direction of correction required, i.e., forward or reverse, and the direction (line or field) of the search line being scanned. The bistables BS are reset one per field by pulses applied at terminal RBS. The bistables are numbered BS1 to BS8 on FIG. 9*b* and it can be seen from the figure that N. Rev. signals are routed to bistable BS1 during the occurrence of signal S.V., and to bistable BS2 during the occurrence of signal S.H. Thus bistables BS1 and BS2 carry the Boolean expression NRV and NRH respectively. The remaining bistables BS3 to BS8 are similarly indicated. In order that an output signal e.g., V. Rev. 2, etc) shall only be produced on the occurrence of a suitable positive-going edge and a suitable negative-going edge (but not necessarily in that order) output gates BSG are controlled by two bistables BS. One of the bistables controlling each output gate BSG is associated with a negative-going edge and the bistable with a positive-going edge of the same sense (i.e., either both forwards or both reverse). The switch 60 is constituted by the terminal 60, the NAND gates BSG and inverting gate G60 shown in FIG. 9*b*. Terminal 60 is connected to a third input of each of the output gates BSG. The switch 60 serves merely to route the N. Rev., P. Rev., N. For., P. For. signals to either of channels 2 or 3 as required. Since it is assumed that output signals will always be supplied to either channel 2 or 3 input 60 receives merely a two-state signal Q or $\bar{Q}$ which is routed to channel 2 output gates BSG, and via an inverter gate G60 to channel 3 output gates BSG. Gate 60 is synchronized with switch 240 as described previously.

We claim:

1. A registration system for use with a color television camera of the component camera tube type comprising means for comparing the amplitude of each of two camera tube video component output signals fed thereto with the same two predetermined reference signals and for producing from the comparison of each video component signal with the reference signals two digital signals, the amplitude of one of which indicates whether the video signal is above or below one of the reference levels and the amplitude of the other of which indicates whether the video signal is above or below the other reference level, means for determining when a component camera tube video output signal has passed from one reference level to another at a faster than a predetermined speed and comparison means for comparing digital signals representative of different video outputs and corresponding to a transition at a faster than said predetermined speed and for producing as a result of the comparison, signals to be used in connection with at least one of the tubes to correct for errors in registration thereof.

2. A registration system as claimed in claim 1 wherein the reference levels are substantially symmetrically spaced about the amplitude level of the video waveform representing "mid-grey."

3. A registration system according to claim 2 which includes means for sampling said digital signals under the control of a clock frequency and for storing the sampled signals for the period between clock pulses, the sampled signals being fed to said means for determining when a component camera tube signal has passed from one reference level to another at a faster than a predetermined speed, said determining means detecting whether said transitions occur during a predetermined number of clock pulses.

4. A registration system according to claim 3 wherein to provide horizontal registration said clock frequency is substantially in excess of the line frequency and to provide vertical registration said clock frequency is equal to said line frequency.

5. A registration system as claimed in claim 3 wherein the two digital signals produced by a first camera tube are each fed directly to and are sampled by a store and digital signals produced by each of the remaining camera tubes are fed via a routing switch in time division multiplex to a further two stores such that said remaining camera tubes are successively brought into registration with said first camera tube.

6. A registration system as claimed in claim 5 wherein the number of remaining camera tubes is two, and the routing switch is switched at one quarter field frequency.

7. A registration system as claimed in claim 3 wherein the said predetermined number of clock pulses is two.

8. A registration system as claimed in claim 3 wherein video signal transitions between the two reference levels which occur faster than or at said predetermined speed produce further signals derived from the aforesaid sampling of the digital signals and which are indicative of both the speed and polarity of the transition.

9. A registration system as claimed in claim 8 which includes means for comparing in pairs the signals derived from the sampling of the digital signals resulting from each video signal to determine whether a registration error is present by delaying one derived signal with respect to the other, and vice versa, by a predetermined amount to determine whether the pair of derived signals are out of registration by the said predetermined amount, and means are provided by which on detection of the said predetermined amount of misregistration in two video signal transitions of opposite polarity an output registration error correction signal is supplied.

10. A registration system as claimed in claim 9 wherein the said comparison means has a limited range which is such as to prevent the output of registration error correction signals when the signals to be compared are the result of two video signal transitions which have a degree of misregistration which is greater than a low multiple of the sampling pulse periods.

11. A registration system for use with a color camera having at least two different component camera tubes, comprising in combination:

first and second input terminals to which the component video signals derived from said two different component camera tubes are applied;

means connected to said first and second input terminals for determining the occurrence of video signals during a selected region of the picture area which video signals have amplitude excursions completely between selected levels occurring faster than a predetermined speed and for producing output signals in response thereto, said selected levels being within the range of normal video signals from the component camera tubes; and means controlled by said output signals for controlling at least one of said component camera tubes to correct for errors in registration therebetween.

12. A registration system as defined in claim 11 wherein said means for determining produces different output signals in response to positive-going and to negative-going video signal excursions.

13. A registration system as defined in claim 12 wherein said means for determining includes bistable means for producing digital signal changes in response to video signal amplitudes which are at said selected levels.

14. A registration system as defined in claim 13 wherein said means for controlling is a logic circuit responsive to said digital signals.

15. A registration system as defined in claim 11 wherein said means for determining comprises bistable means associated with said first input terminal for producing digital signal changes in response to video signal amplitudes which are at said selected levels and bistable means associated with said second input terminal for producing digital signal changes in response to video signal amplitudes which are at said selected levels.

16. A registration system as defined in claim 15 wherein said means for controlling is a logic circuit responsive to said digital signals.

* * * * *

UNITED STATES PATENT OFFICE
CERTIFICATE OF CORRECTION

Patent No. 3,700,790 Dated October 24, 1972

Inventor(s) Derek Vernon Ryley and Gyongyver Claydon

It is certified that error appears in the above-identified patent and that said Letters Patent are hereby corrected as shown below:

In the heading,

"Inventor: Derek Vernon Ryley, Claydon,
Gyongyver, Essex, England"

should read:

--Inventors: Derek Vernon Ryley and Gyongyver Claydon,
Essex, England--.

Signed and sealed this 10th day of July 1973.

(SEAL)
Attest:

EDWARD M.FLETCHER,JR.
Attesting Officer

Rene Tegtmeyer
Acting Commissioner of Patents